Nov. 28, 1944.   A. F. BENNETT   2,363,934
DRIVING AND CONTROL MECHANISM FOR MILLING AND SIMILAR MACHINES
Filed Oct. 31, 1941   6 Sheets-Sheet 1

Witness
Charles J. Olson

Inventor
Arthur F. Bennett

Nov. 28, 1944.                A. F. BENNETT                  2,363,934
DRIVING AND CONTROL MECHANISM FOR MILLING AND SIMILAR MACHINES
Filed Oct. 31, 1941                  6 Sheets-Sheet 4

Witness
Charles J. Olson

Inventor
Arthur F. Bennett
by Fish Hildreth
Cary & Jenney
Attys

Nov. 28, 1944.   A. F. BENNETT   2,363,934
DRIVING AND CONTROL MECHANISM FOR MILLING AND SIMILAR MACHINES
Filed Oct. 31, 1941   6 Sheets-Sheet 6

Fig. 23

Witness
Charles T. Olson

Inventor
Arthur F. Bennett
by Fred Hildreth
Cary & Jenney
attys

Patented Nov. 28, 1944

2,363,934

UNITED STATES PATENT OFFICE 2,363,934

DRIVING AND CONTROL MECHANISM FOR MILLING AND SIMILAR MACHINES

Arthur F. Bennett, West Barrington, R. I., assignor to Brown and Sharpe Manufacturing Company, a corporation of Rhode Island Application October 31, 1941, Serial No. 417,342

24 Claims. (Cl. 90—18)

The present invention relates to improvements in driving and control mechanism for milling and similar machines.

The invention is herein disclosed in a preferred form as embodied in a milling machine having a rotary milling cutter spindle, and a work supporting assembly including a table, saddle and knee. The driving connections for the work supporting assembly comprise an electric motor, feed and quick traverse gear trains continuously driven therefrom, a feed-quick traverse clutch mounted on the knee, and branch transmissions from the feed-quick traverse clutch including individual reversers and irreversible screw and nut driving connections to each of the table, saddle and knee. An individual electric motor having appropriate driving connections therefrom is provided for driving the milling cutter spindle. For starting and stopping the machine, applicant provides a main starting and stopping lever which operates through switch connections to start and stop the spindle and work support assembly motors. Individual manual controls are provided for operating each of the several reversing clutches, and the feed-quick traverse clutch of the machine.

It is a principal object of the invention to provide in a machine of this general description having separate electric motors for driving the spindle and work supports and mechanical driving connections including variable speed gearing and control clutches, a driving and control system in which the electrical driving and switching devices and the mechanical motion transmitting and clutching devices are caused to cooperate with one another in a novel manner for the more efficient and accurate operation of the machine.

It is another object of the invention to provide in a machine of this general description having electrical operating controls including a starting and stopping control for the machine, a device which is rendered operative in stopping the machine to bring the moving work support or supports to rest before the spindle motor and milling cutter spindle driven thereby have ceased to rotate.

It is another object of the invention to provide in a machine of this general description having feed and quick traverse gear trains and clutching means associated therewith, a novel and improved actuating and control mechanism which is adapted to provide for feed and quick traverse operation of the table either manually or in accordance with a semi-automatic cycle of operation.

Other objects of the invention are concerned more specifically with certain improvements in the construction and arrangement of the driving and control mechanism for controlling the operation of the milling cutter spindle and the support or supports comprising the work supporting assembly in a machine tool of this general description.

In accordance with the invention, the clutching devices of the drive for the work supporting assembly, and more particularly the feed-quick traverse clutch, is arranged to cooperate with the electrical operating and control devices in a novel manner for the carrying out of a number of operating functions of the machine. The feed-quick traverse clutch is normally controlled by means of a manually operable feed-quick traverse control lever which is shifted to the quick traverse position by the hand of the operator, and is returned to the feed position by spring means which acts always to bias the clutch toward the feed position. The starting, stopping and reversing of the individual supports including table, saddle and knee is controlled by means of manually controlled reversing clutches in the branch driving transmissions for these parts.

Specifically, in accordance with one feature of the invention, applicant provides means which is rendered operative when the spindle and support assembly motors are de-energized to shift the feed-quick traverse clutch from the feed to a neutral position to insure the stopping of support movement before the rotating cutter spindle comes to rest. This is of particular importance to avoid injury to the machine or work in the event that the operator employs the main start and stop lever to stop the machine while milling. The shifting of the feed-quick traverse clutch to neutral serves to disconnect the moving support, whether table, saddle or knee, from the support motor and variable speed feed gearing which are then brought to a gradual stop. The irreversible screw and nut driving connection through which the support is driven, when relieved of the relatively great driving inertia of these parts, acts to bring the table to an almost instantaneous stop. In the illustrated construction, the shifting of the feed-quick traverse clutch to the neutral position is effected by means of a power actuated throwout device and electrical operating connections including a solenoid which is arranged to be de-energized when the spindle motor is de-energized.

Further in accordance with the invention, the mechanism for disconnecting the moving support from the feed driving connections upon stopping the spindle motor, is so arranged as to permit the continued power drive of any one or more of the supports of the work supporting assembly at the quick traverse rate independently of whether the spindle motor is running or not. Movement of a work support at the traverse rate, when the spindle motor is stopped, is effected by moving the feed-quick traverse clutch from the neutral position in which it is held by the throwout device to the quick traverse position. Shifting of the feed-quick traverse clutch to the quick traverse position acts to close a start switch to start the support motor. The manual feed-quick traverse control lever acts under these circumstances as a start and stop control for the table, saddle and knee.

Further in accordance with the invention, control means are provided which will adapt the machine for operation when so desired in accordance with a semi-automatic cycle of operation in which the work support is started moving at the traverse rate, and is automatically slowed to the feed rate immediately before the milling cutter is brought into engagement with the work. The control means referred to, is in the form of a latching device, which is available to retain the feed-quick traverse clutch in the quick traverse position to which it is moved by the hand of the operator, and which operates through the agency of table dogs to effect the shift from quick traverse to feed. The latch is controlled through operating connections which include a solenoid, a switch, and a switch actuating plunger controlled by dogs on the work supporting table. The semi-automatic control thus provided may be rendered operative or may be disabled as desired by means of a selector knob.

Further in accordance with the invention, applicant provides means under the control of the operator to disengage the latch and to return the feed-quick traverse clutch to its feed position independently of the operation of the dog actuated switch. The mechanism provided to this end, consists of a lost motion connection interposed between the feed-quick traverse control lever and the rock shaft actuated thereby, and cam means which is rendered operative by movement of the feed-quick traverse lever from its quick traverse position to positively withdraw the latch.

The several features of the invention consist also in the devices, combinations and arrangement of parts, which together with the advantages to be obtained thereby, will be readily understood by one skilled in the art from the following description taken in connection with the accompanying drawings, in which.

The machine illustrated in the drawings, comprises a column support 20 on which is mounted a horizontally disposed milling cutter spindle 22, and a work supporting assembly comprising a knee 24 vertically adjustable on ways 26 on the front side of the column, a saddle 28 slidable on ways 30 on the knee 24, and a table 32 movable longitudinally on ways 34 on the saddle 28.

Figures 1, 2:
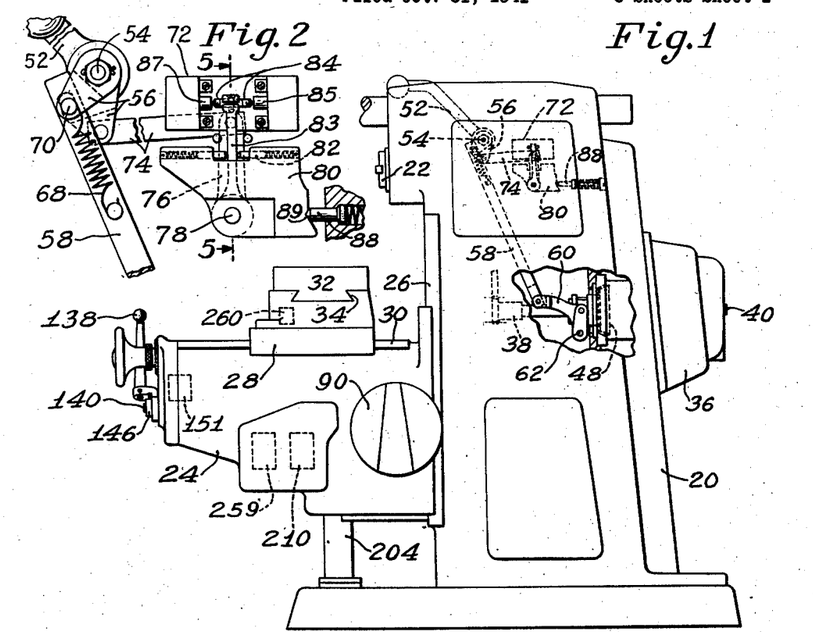
Fig. 1 is a view in right side elevation of a milling machine embodying in a preferred form the several features of the invention.
Fig. 2 is an enlarged detail view of the start and stop switch shown in Fig. 1, but with the machine casing removed to show the underlying parts.
Figures 3, 4, 5:
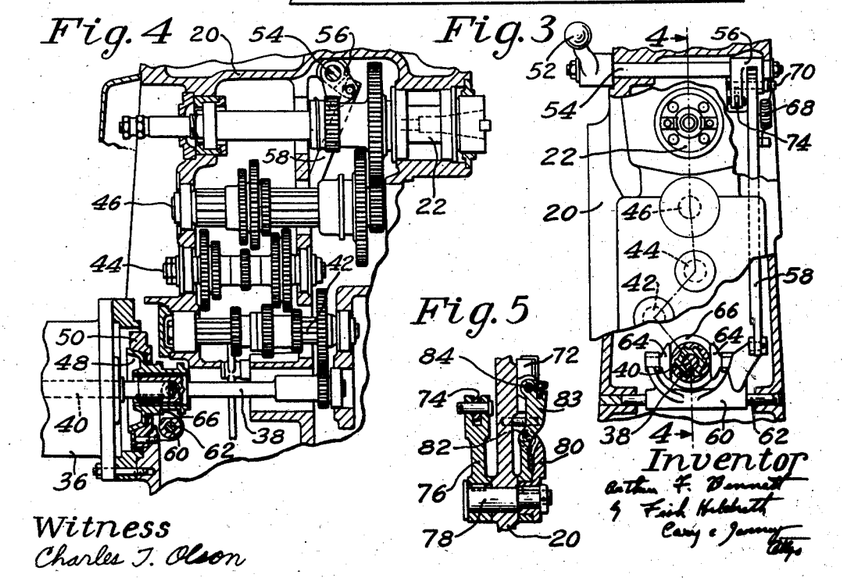
Fig. 3 is a detail view in front elevation of the milling cutter spindle supporting column, with portions of the machine casing broken away to show underlying parts.
Fig. 4 is a sectional view taken on the line 4—4 of Fig. 3, to illustrate particularly the variable speed gear driving connections to the spindle.
Fig. 5 is a detail sectional view taken on the line 5—5 of Fig. 2.

The milling cutter spindle 22, as best shown in Figs. 1, 3 and 4, is driven from an electric motor 36, mounted on the column 20 through variable speed driving connections which may be of ordinary description. These connections comprise a driving shaft 38 connected to the armature shaft 40 of the motor, and intermediate shafts 42, 44 and 46 supporting thereon shiftable gears and gear clusters through which the variable speed drive is transmitted to the spindle 22.

For bringing the spindle to a quick stop in stopping the machine, a mechanical brake is provided, which comprises a cone-shaped brake member 48, having the sleeve hub portion thereof keyed to and axially slidable with relation to an enlarged end portion of the shaft 38 connected with the armature shaft 40 of the spindle motor 36. The brake member 48 is arranged for movement forwardly into frictional engagement with a cooperating brake element 50, fixedly supported in the machine frame. The brake 48 is mechanically connected and operates in conjunction with the starting and stopping lever 52 of the machine mounted on the left side of the machine column 20. As best shown in Figs. 1 to 4 inclusive, of the drawings, the starting and stopping lever 52 is secured to a transversely extending rock shaft 54 having secured thereto a U-shaped lever 56. One arm of the lever 56 is connected by means of a link 58 with a brake shifting lever 60, pivoted at 62 and having a forked portion on which are mounted shoes 64 for engagement with an annular groove 66 in the sleeve hub of the shiftable brake member 48. A tension spring 68 connected at one end with a pin on the link 58 and at its other end with a pivot pin 70 forming part of a lost motion connection between the link 58 and lever arm 56 acts to shorten the connection and to maintain the brake member 48 in its open or disengaged position. The starting and stopping lever 52 is connected also to operate the starting and stopping switch for the machine, indicated generally at 72 in Fig. 1. The second arm of the U-shaped lever 56 is connected by means of a link 74 with an arm 76 keyed to a rock shaft 78. Also secured to the rock shaft 78 is a switch control lever 80 which takes the form of a plate having mounted thereon two oppositely disposed spring-pressed plungers 82 for engagement with a switch actuating arm 83. Movement of the switch actuating arm 83 to the right from the intermediate position shown in Fig. 2, causes an adjustable contact screw 84 thereon to press the stop switch button 85. Movement of the switch actuating arm 83 to the left causes an adjustable contact screw 84 to press the start switch button 87. A spring-pressed plunger 88 arranged for engagement with a notch 89 formed in one side of the switch control lever 80, serves to support the switch control lever 80 and the connections associated therewith including the switch actuating arm 83, the starting and stopping lever 52, and the brake member 48 in an intermediate neutral position.

Assuming that the machine is in rest position, upward movement of the starting and stopping lever 52 acts to shift the switch control lever 80 and the switch actuating arm 83 to the left to press the switch start button 87. This acts to start the table and spindle motors as hereinafter more fully pointed out in connection with the description of the electrical control system for the machine. The starting and stopping lever 52 when released by the operator, returns to its neutral position, leaving the machine in running condition. In the event that it is desired to stop the machine, downward movement of the starting and stopping lever 52 operates to shift the switch control lever 80 and with it the switch actuating arm 83 to the right to press the stop switch button 85 which acts through electrical connections hereinafter described, to de-energize both the table and spindle motors. This downward movement of the starting and stopping lever 52 acts also through the mechanical connections described, to apply the spindle motor brake, thus bringing the spindle motor to a quick stop. When released from the hand of the operator, the starting and stopping lever 52 again returns to its neutral position, leaving the machine in a stopped condition and with the spindle brake again disengaged.

Figures 6, 7, 8:
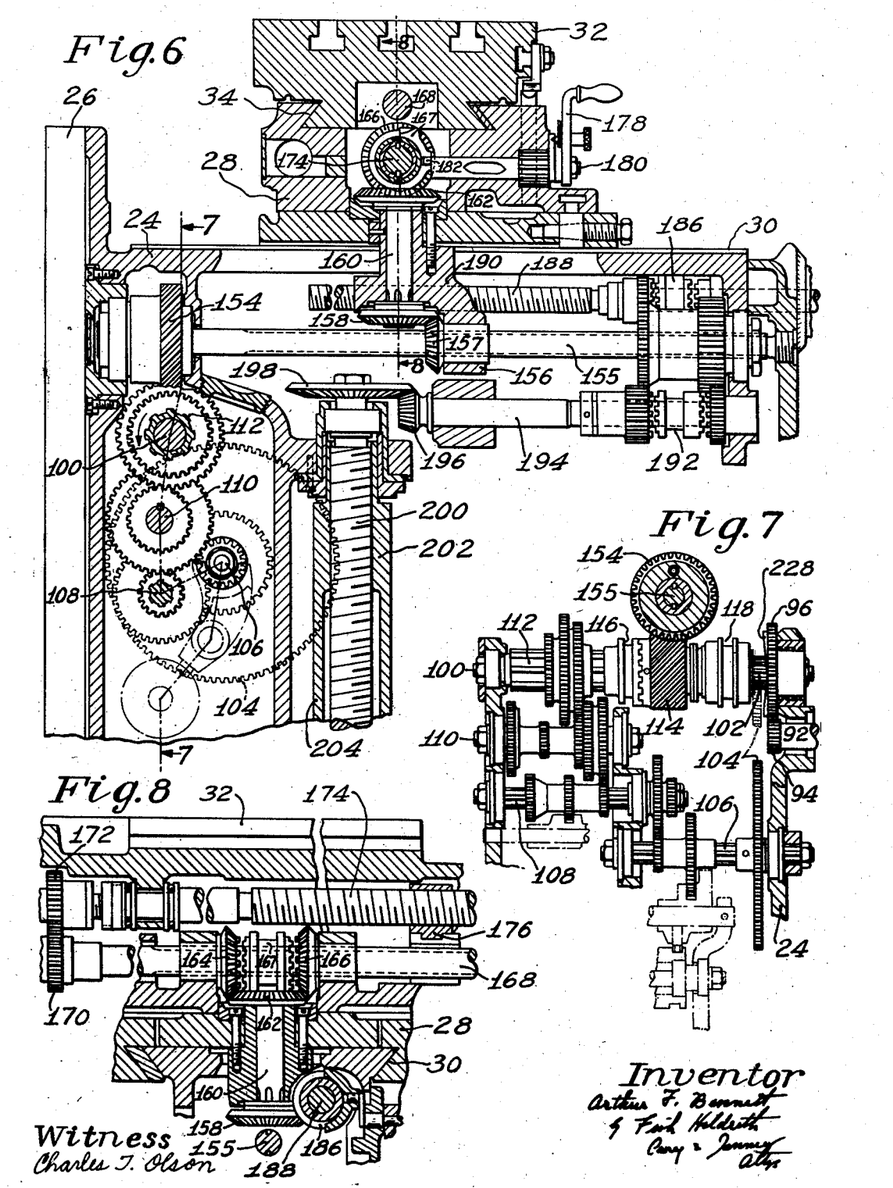
Fig. 6 is a sectional view in right side elevation illustrating particularly the driving connections for the work supporting assembly including the branch transmissions with individual reversers for the table, saddle and knee.
Fig. 7 is a sectional view taken on the line 7—7 of Fig. 6, illustrating particularly the feed and quick traverse gear trains and the feed-quick traverse clutch.
Fig. 8 is a sectional view taken on the line 8—8 of Fig. 6, illustrating particularly the driving connections including the reverser and feed screw and nut by which the table is driven.
Figures 9, 10, 11, 12, 13:
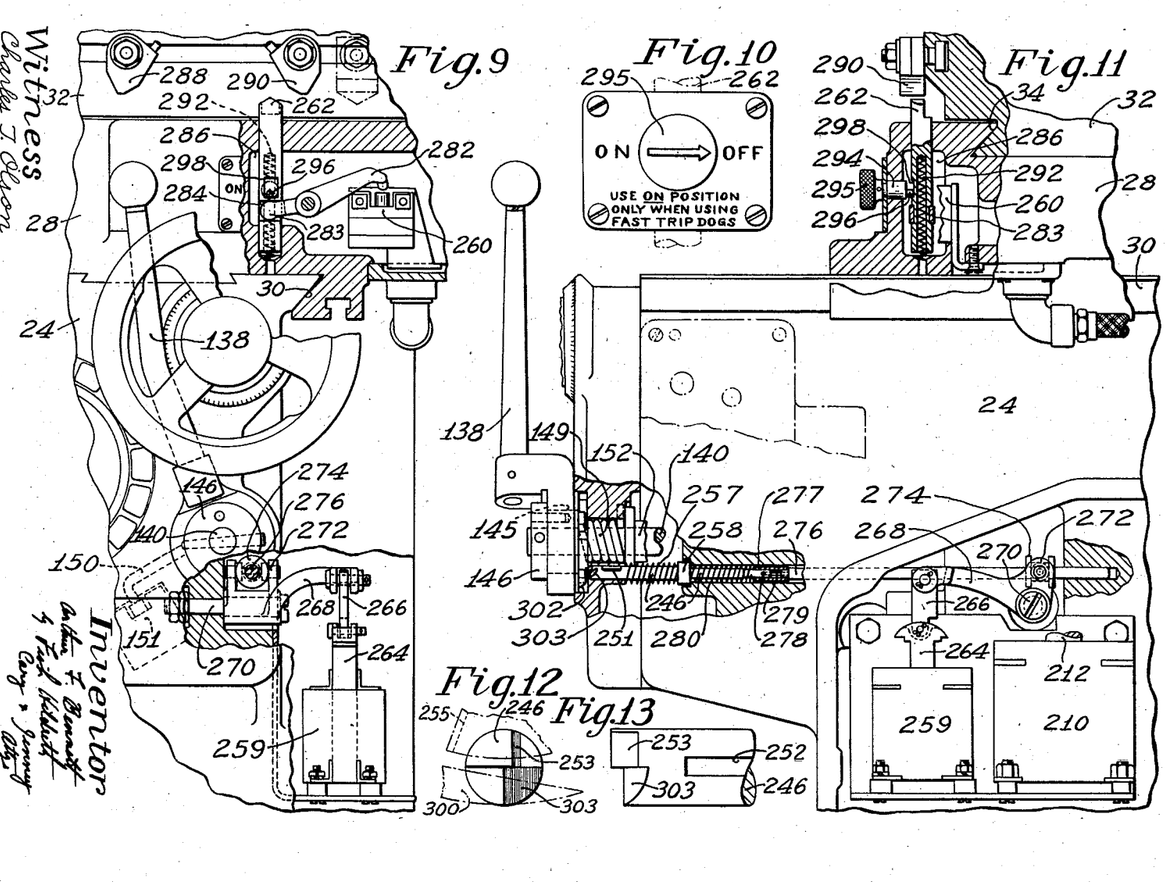
Fig. 9 is a fragmentary view in front elevation with parts broken away to illustrate particularly the semi-automatic control for the feed-quick traverse clutch.
Fig. 10 is a detail view showing particularly the selector knob for rendering the semi-automatic control for the feed-quick traverse clutch operative or inoperative.
Fig. 11 is a view in right side elevation with parts broken away and underlying parts corresponding generally with those illustrated in Fig. 9 shown in section.
Fig. 12 is a detail end view of the locking plunger for maintaining the feed-quick traverse clutch in its quick traverse position.
Fig. 13 is a view looking from the right, of the locking plunger shown in Fig. 12.

The drive for the table, saddle and knee is taken from an electric motor 90 (see Figs. 1 and 14) supported on the right side of the knee 24. As shown in Fig. 7, the armature shaft 92 of the motor 90 has formed thereon a gear 94 which meshes with a gear 96 on a quick traverse driving sleeve member 98 loosely mounted to turn on a transverse shaft 100, supporting the feed-quick traverse clutch mechanism hereinafter more fully to be described. The gear 96 and the sleeve member 98 provide the quick traverse driving connections from the motor 90 to the feed-quick traverse clutch.

The table, saddle and knee are arranged to be driven at a feed rate from the motor 90 through a variable speed reduction gear train having provision for sixteen speed changes. The feed gear train, as best shown in Figs. 6 and 7 of the drawings, comprises a small gear 102, formed on the sleeve 98, which meshes with a gear 104 on an intermediate drive shaft 106. Thence the drive is taken though intervening gear clusters mounted upon the shaft 106 and intermediate shafts 108, 110, to a feed driving sleeve member 112 loosely mounted to turn on the feed-quick traverse clutch supporting shaft 100.

Figures 14, 15, 16, 17, 18:
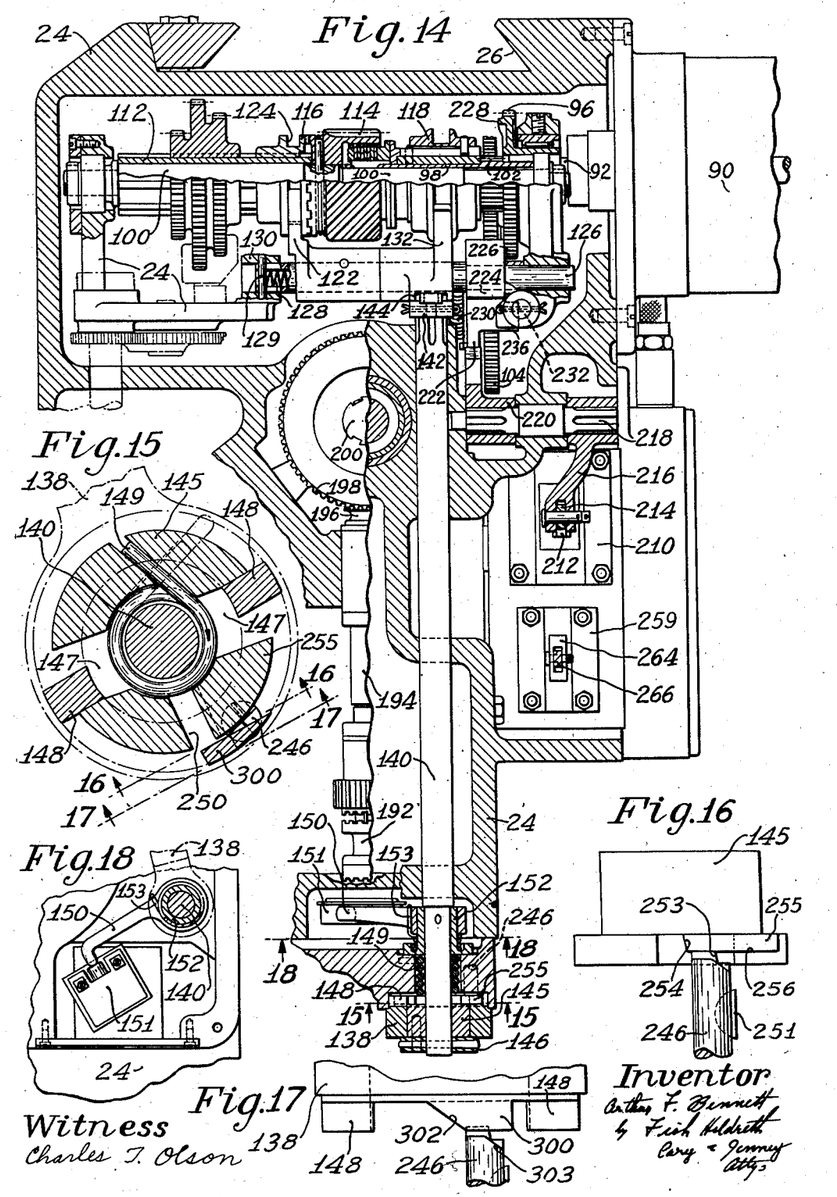
Fig. 14 is a sectional plan view of the knee illustrating particularly the feed-quick traverse clutch and the several mechanisms for controlling the operation of the same.
Fig. 15 is a sectional view, but on a larger scale, taken on the line 15—15 of Fig. 14.
Fig. 16 is a detail view showing the locking plunger in its retracted position in engagement with the rest surface formed on the flanged portion of the cooperating sleeve member, this figure being taken generally on the line 16—16 of Fig. 15.
Fig. 17 is a similar view showing particularly the throw-out cam formed on the hub portion of the feed-quick traverse lever, taken substantially on the line 17—17 of Fig. 15.
Fig. 18 is a detail sectional view taken on the line 18—18 of Fig. 14, and illustrating particularly the control switch for energizing the feed motor.

The feed-quick traverse clutch, as best shown in Fig. 14, comprises a driven element in the form of a spiral gear 114 which is secured to the shaft 100, and is interposed between the quick traverse driving sleeve member 98 and the feed driving sleeve member 112. The spiral gear 114 is connected to be driven at a feed rate from the feed driving sleeve member 112 by means of a feed clutch element 116 keyed to turn with and to slide axially with relation to the feed driving sleeve member 112, and for engagement with cooperating clutch teeth formed on one face of the spiral gear 114.

The spiral gear 114 is connected to be driven at the traverse rate from the quick traverse driving sleeve 98 by means of a disc type friction clutch, comprising a quick traverse sleeve clutch member 118 keyed to turn with and to slide axially with relation to the quick traverse driving sleeve 98. A series of disc friction clutch elements on the sleeve 118 are arranged for engagement with a corresponding series of disc friction clutch elements carried on the cylindrical surface of an axial bore in the spiral gear 114.

For controlling the axial position of the feed clutch element 116 and quick traverse clutch element 118, a clutch shifting mechanism is provided which comprises a shifting fork 122 arranged for engagement with an annular groove 124 in the feed clutch element 116 and an axially shiftable supporting rod 126 to which the shifting fork 122 is rigidly secured. A compression spring 128 seated within an axial bore in the rod 126, and engaging at its outer end against a cross pin 129 mounted in the bearing support 130 for the rod, tends to shift the rod 126 and clutch shifting fork 122 axially to the right to a position in which the feed clutch 116 is engaged to drive the spiral gear 114 at the feed rate. The position of the quick traverse clutch element 118 is controlled by means of a shifting fork 132 which is loosely sleeved on the rod 126 in abutting relation to the shifting fork 122.

Control of the feed-quick traverse clutch is effected manually by means of a feed-quick traverse control lever 138. The lever 138 is operatively connected to the forward end of a clutch control rock shaft 140 which carries at its rear end a clutch shifting arm 142 with a shoe 143 pivotally mounted thereon for engagement with a slot 144 formed in the quick traverse clutch shifting fork 132. A loose coupling is provided between the lever 138 and rock shaft 140 to provide for a limited movement of the lever 138 relative to the rock shaft 140 in either direction. The lost motion thus provided is employed to permit the unlatching of the feed-quick traverse clutch and its return from the quick traverse to the feed position under the control of the feed-quick traverse lever during operation in accordance with a semi-automatic cycle of operation, as hereinafter more fully to be described. The lever 138 is loosely supported to turn on a sleeve element 145 between the flanged inner end thereof and a locking collar 146 which serves to secure the sleeve element 145 to the shaft 140. The flanged portion of the sleeve 145 has formed therein segmental slots 147 which engage loosely with lugs 148 formed on the adjacent face of the hub of the lever 138. A torsion spring 149 coiled about the rock shaft 140 and secured at one end to the machine frame, and at its other end to the sleeve 145 tends to rock the shaft 140 in a clockwise direction. With the construction and arrangement of the feed-quick traverse clutch shifting mechanism above described, it will readily be seen that movement of the manually operable feed-quick traverse lever 138 and rock shaft 140 in a clockwise direction will move the quick traverse shifting fork 132 to the right, disengaging the quick traverse clutch, and at the same time permitting movement of the feed clutch shifting fork 122 and the feed clutch element 116 to the right to the engaging feed position under the influence of spring 128. Movement of the feed-quick traverse lever 138 and rock shaft 140 in a counterclockwise direction acts to move the quick traverse shifting fork 132 and clutch element 118 leftwardly into engaging position. The shifting fork 122, in abutting engagement with the fork 132, is moved positively to the left therewith to shift the feed clutch element 116 to its inoperative position.

The movement of the feed-quick traverse lever 138 to quick traverse position acts also to close a table starting switch which acts to start the table motor, if the table motor is not already running. The table starting switch referred to, comprises a switch actuating arm 150 on the rock shaft 140, which is arranged on movement of the quick traverse control lever 138 to its quick traverse position, to engage with and close a table motor starting switch 151. The switch arm 150 is loosely mounted on a sleeve 152 pinned to the shaft 140, and is urged to a limiting position in a counterclockwise direction, determined by cooperating abutments on the switch arm 150 and sleeve element 152, by means of a coiled torsion spring 153 connected at one end to the sleeve 152 and at its other end to the switch arm 150.

The drive for the table, saddle and knee, is taken from the spiral gear 114 through branch transmissions, each of which includes a reversing clutch and an irreversible driving connection. As best shown in Figs. 6 and 8, the spiral driving gear 114 meshes with a spiral gear 154 which is supported on and operatively connected with a drive shaft 155 supported in the knee.

The drive for the table is taken from the shaft 155 through connections which include a beveled gear 157 splined to the shaft 155 and externally supported on a bearing bracket 156 on the saddle 28 for engagement with a beveled gear 158 on the lower end of a vertically extending shaft 160. A beveled gear 162 secured to the upper end of the shaft 160, is arranged to engage with and to drive in reverse directions beveled gears 164 and 166, supported to turn on a shaft 168 carried on the table 32. A reversing clutch element 167 splined to the shaft 168 is interposed between the reversely driven gears 164, 166, and is shiftable axially from an intermediate neutral position into driving engagement with cooperating clutch faces formed on each of the gears 164, 166. The shaft 168 is connected by gears 170, 172 to the table feed screw 174 which is rotatably supported on the table 32 and is screw-threaded to a nut 176 fastened on the saddle 28. The position of the table reversing clutch 167 is controlled in the usual manner by means of a reversing lever 178, which may be of ordinary description, and is secured at the forward end of a clutch shifting rod 180 rotatably mounted in the saddle, and provided at its rear end with an offset shifting element 182 for engagement with the clutch sleeve 167.

The drive for the saddle is taken from the drive shaft 155 through connections including a reversing clutch 186 and a saddle feed screw 188 which meshes with a nut 190 formed in the saddle as generally indicated in Fig. 6.

The power drive for the knee is similarly taken from the shaft 155 through connections including a knee reversing clutch 192, a drive shaft 194, beveled gears 196, 198, a vertically arranged feed screw 200, and a nut 202 formed in a sleeve element 204 supported from the base of the machine.

A feature of the invention consists in the provision of a mechanism for shifting the feed-quick traverse clutch from its feed position to a neutral position when the machine is stopped, so that the table, saddle or knee, as the case may be, freed from the inertia inherent in the table motor, and in the variable speed feed gear train, will stop before the spindle motor and spindle driven thereby have ceased to rotate.

Figures 19, 20, 21, 22:
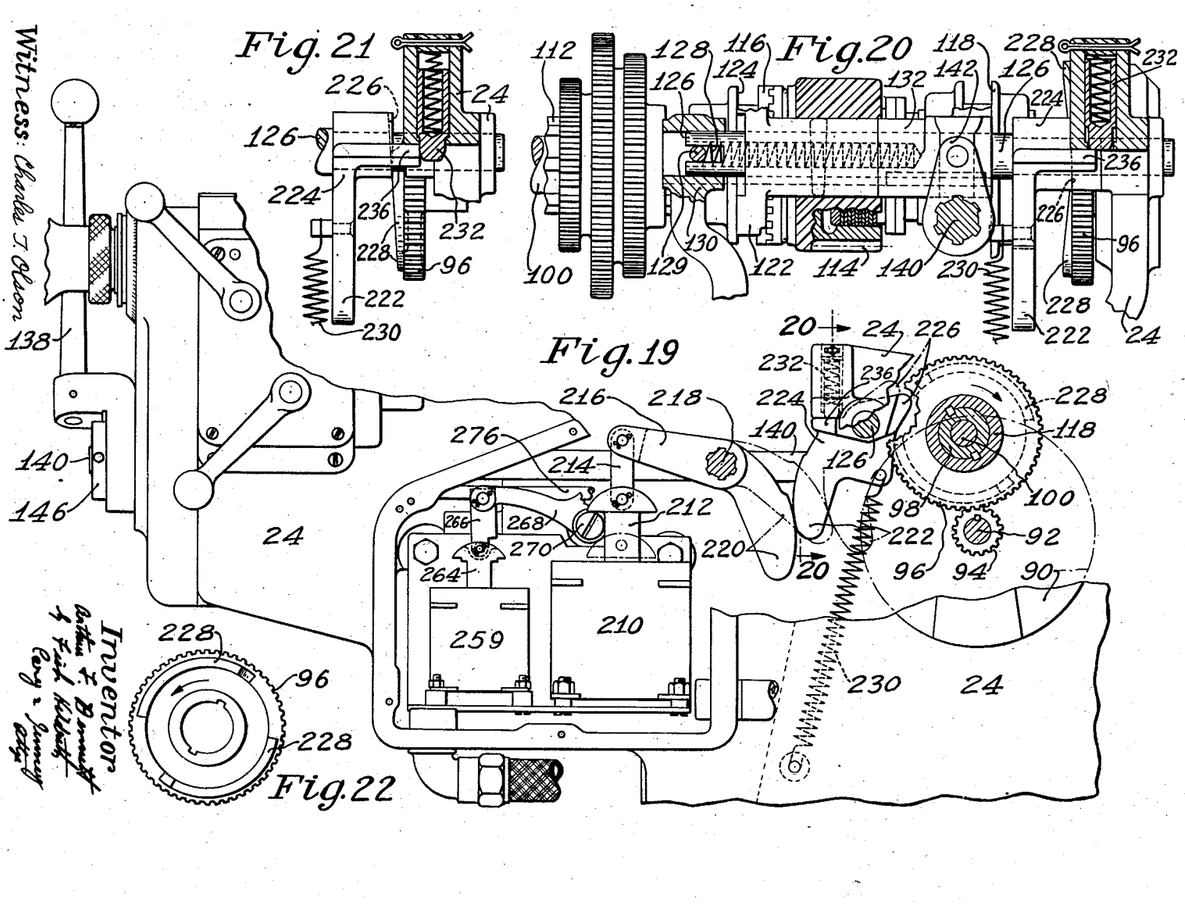
Fig. 19 is a view in right side elevation illustrating a portion of the knee, and more particularly the mechanism operative in stopping the machine to shift the feed-quick traverse clutch from the feed position to the neutral position.
Fig. 20 is a view in front elevation taken on the line 20—20 of Fig. 19.
Fig. 21 is a fragmentary view showing the clutch axial shift cam and follower lever for a different position of the parts in which the clutch has been shifted to neutral position.
Fig. 22 is a detail view of the axial shift cam formed on one face of a gear in the quick traverse train.

The mechanism provided in accordance with the present invention for shifting the feed-quick traverse clutch to a neutral position, is arranged to be controlled by means of a solenoid 210 which is de-energized at the same time that the spindle motor is de-energized. As best shown in Figs. 14, and 19 to 22 inclusive, the solenoid 210 is provided with an armature 212 connected by a link 214 with a actuating lever 216 secured to a pivot shaft 218. A downwardly extending contact lever arm 220 also is secured to the pivot shaft 218, and is arranged for engagement with a downwardly extending tail 222 of a feed throwout operating lever 224 loosely mounted to turn on the clutch shifting fork supporting rod 126. The feed throwout operating lever 224 is provided with a relatively wide tail portion 226 which is brought by a clockwise movement of the lever into the path of a face cam 228 formed on one face of the quick traverse driving gear 96. Figs. 19 and 20 show the parts in position with the lever 224 in its advanced position opposite the low portion of the face cam 228. During continued rotation of the quick traverse driving gear 96, the rise portion of face cam 228 will engage and force the feed throwout operating lever axially to the left from the position shown in Fig. 20, carrying with it the shifting forks 122 and 132 and supporting shaft 126, to an intermediate neutral position in which the feed clutch element 116 is disengaged from the spiral gear 114. A tension spring 230 connected between the feed throwout operating lever 224 and a point on the machine frame, tends to rock the lever 224 in a clockwise direction to maintain the tail portion 222 in engagement with the lever 220, and to move the lever 224 into the clutch throwout position shown in Fig. 19, when permitted by the de-energizing of the solenoid 210 and consequent upward movement of the armature 212.

In order to hold the parts of the feed-quick traverse shifting mechanism in their neutral position, a spring-pressed detent plunger 232 is provided which is arranged to cooperate with a laterally extending arm 236 of the feed throwout operating lever 224. The initial movement of the feed throwout operating lever 224 under the influence of its spring 230 inwardly to its throwout position, serves to engage the laterally extending arm 236 thereof beneath and to raise the detent 232. The subsequent lateral movement of the feed throwout operating lever 224 under the influence of cam 228 causes the arm 236 to ride out from under the detent plunger 232, which then drops into locking position.

The feed throwout mechanism is rendered inoperative, permitting the return of the feed-quick traverse clutch to its feed position, only when the spindle motor is again started. The starting of the spindle motor acts through electrical connections hereinafter to be described, to energize solenoid 210. The armature 212 is depressed, rocking the actuating lever 216 and the throwout operating lever 224 in a counterclockwise direction from the position shown in Fig. 19, so that the tip portion 226 is moved out of the path of the face cam 228, and the arm 236 is dropped beneath and out of engagement with the detent plunger 232. The throwout operating lever 224 together with the supporting shaft 126 and shifting forks 122, 132 will now shift under the influence of spring 128 to the feed clutch engaging position to the right.

In accordance with another feature of the present invention, the mechanism for controlling the position of the feed-quick traverse clutch is constructed and arranged to permit this clutch to be operated either manually or through the agency of table dogs in accordance with a semi-automatic cycle of operations. Under conditions of manual operation, the feed-quick traverse control lever 138 is shifted to its quick traverse position, and must be supported manually in this position so long as it is desired to operate the support at the quick traverse rate. For operation of the machine in accordance with a semi-automatic cycle in which the work support has started to move at the traverse rate, and is automatically slowed to the feed rate immediately before the milling cutter engages the work, applicant provides an automatic control mechanism in the form of a latching device which is available to retain the feed-quick traverse clutch in its quick traverse position to which it is moved by the operation of the feed-quick traverse control lever 138. The latch is subsequently disengaged through the agency of dogs on the table to shift the clutch from the quick traverse to the feed position.

The latching device shown in Figs. 9 to 18 inclusive, comprises a plunger 246 supported on the knee in parallel relation to the rock shaft 140, and arranged for advancing movement into engagement with a radial slot 250 formed in the flanged portion of the sleeve member 145 secured to the rock shaft 140. A key 251 engaging in a keyway 252 in the plunger prevents rotational movement of the plunger in its bearing. As shown, for example, in Figs. 12 and 15, the plunger 246 is spaced from the rock shaft 140 so that only half of its diameter will be engaged within the slot 250, the other half lying outside of the peripheral surface of the flanged portion of the sleeve member 145. The inner half of the tip portion of the plunger 246 is provided with a detent surface 253 which is arranged upon movement of the rock shaft 140 to its quick traverse position to engage a cooperating detent surface 254 on a segment 255 of the flanged portion of the sleeve member 145 to latch the parts in the quick traverse position. As shown in Fig. 16, the segment 255 has the face portion thereof slabbed off to provide a rest surface 256 against which the plunger 246 may be engaged when the rock shaft 140 and sleeve member 145 are in the feed position. A compression spring 257 coiled about the plunger 246 between an abutting shoulder on the knee and a collar 258 on the plunger, acts normally to maintain the plunger in a retracted position. Rotation of the rock shaft 140 and the sleeve member 145 in a counterclockwise direction to the quick traverse position, acts to bring the slot 250 into register with the plunger 246, which may now be advanced to engage the cooperating detent surfaces 253, 254 to latch the feed-quick traverse clutch in its quick traverse position.

The plunger 246 is urged forwardly to latch the clutch in its quick traverse position, and is subsequently retracted to permit the return of the clutch to its feed position in accordance with a semi-automatic cycle of operation of the machine, by means of operating connections which include a solenoid 259, a solenoid control switch 260 and a switch actuating plunger 262 controlled by dogs on the work supporting table 32. The solenoid 259 is arranged when energized to advance the plunger 246 into its locking position against the pressure of the spring 257. The armature 264 of the solenoid 259 is connected by a link 266 with one arm of a bell-crank 268 supported to turn on a fixed pivot 270. The other arm of the bell-crank takes the form of a shifting fork having trunnions 272 for engagement with a slotted collar 274 on an axially movable rod 276 forming a rearward extension of the plunger 246. A yieldable coupling is provided between the rod 276 and plunger 246 in the form of a sleeve member 277 which is fitted over the abutting reduced end portions of the rod 276 and plunger 246. A cross pin 278 in the reduced rear end portion of the plunger 246 is arranged for engagement with a longitudinal slot 279 in the coupling sleeve 277, and serves to limit the advancing movement of the plunger 246 with relation to the sleeve 277. A compression spring 280 coiled about the plunger 246 between the coupling sleeve 277 and the collar 258 serves to maintain the plunger 246 in its relatively extended position with relation to the coupling sleeve 277 and rod 276 against which the sleeve is engaged. As will readily be evident from an inspection of Fig. 11, the energizing of the solenoid 259 causes the rod 276 to be advanced. Since the spring 280 tending to maintain the yielding coupling in its extended position, is of greater strength than the spring 257, the plunger 246 is urged forwardly toward its latching position. Movement of the feed-quick traverse lever to its quick traverse position will now cause the plunger riding on the rest surface 255 to drop into latching position in the slot 250. It will be noted that the cooperating detent surfaces 253, 254 are slightly angled to facilitate the withdrawal of the plunger, so that the plunger will certainly be withdrawn by the action of the spring 257 when the solenoid 259 is again de-energized.

The control switch 260 for the solenoid 259 is supported on the saddle 28, and is arranged to be actuated by means of a switch control lever arm 282, one arm of which is arranged to be moved into engagement with the switch, and the other arm of which is operatively connected with the switch actuating plunger 262. The operative connection referred to, comprises a follower element 283 on the end of the lever 282 which engages within a transverse slot 284 in the plunger 262. The plunger 262 is arranged to slide vertically in a recess 286 formed in the forward end of the saddle 28, and is pushed yieldingly upwardly into the path of movement of cooperating dogs 288 and 290 by means of a compression spring 292 seated at one end in the base of the recess 286, and at its other end within an axial bore formed in the lower end of the plunger 262.

Assuming that the switch actuating plunger 262 is in its raised operative position, and that the switch control lever 282 is in its correspondingly depressed switch engaging position, the switch 260 is closed, so that starting of the machine as, for example, by the manual shifting of the feed-quick traverse lever to its quick traverse position with the closing of switch L1—3 will then energize solenoid 259 to latch the feed-quick traverse clutch in its quick traverse position. The downward movement of the plunger 262 under the influence of the dogs 288 and 290, acts to raise the switch lever 282 out of engagement with the switch 260, so that the switch is permitted to move to its open position to de-energize the solenoid 259, and thereby to permit the withdrawal of plunger 246 under the influence of its spring 257, and the return of the feed-quick traverse clutch to its feed position.

The semi-automatic control thus provided, may be thrown into and out of operation through the agency of a rotatable control element 294 which is rotatably supported on the saddle 28 for rotational movement between alternative off and on positions. The control element 294 is provided at its forward end with a knurled knob 295 and at its rear end with an axially offset lug 296 which engages in a transverse slot 298 formed in the switch actuating plunger 262. Movement of the control element 294 to its off position acts to depress the switch actuating plunger 262 and to correspondingly raise the switch control lever 282, so that the switch 260 is permitted to open, thus maintaining the solenoid 259 de-energized to prevent the latching of the feed-quick traverse clutch in its quick traverse position.

Further in accordance with the invention, the feed-quick traverse control lever 138 and the operating connections therefrom are so arranged as to permit the operator to disengage the latching device and to shift the feed-quick traverse clutch to its feed position during the performance of a semi-automatic cycle by a simple manipulation of the feed-quick traverse lever. As previously pointed out, the feed-quick traverse control lever 138 is connected to the rock shaft 140 through a lost motion connection which permits the lever 138 to be moved through a limited angle in either direction before the connection becomes effective to turn the rock shaft 140. A lug 300 having a cammed surface 302 on one end thereof, is provided on the hub face of lever 138 to cooperate with a cam surface 303 formed on the outer half of the end portion of plunger 246. During movement of the feed-quick traverse lever 138 to the quick traverse position, the lug 300 passes over and beyond the plunger 246 which for the feed position of the parts has been maintained in a retracted position in contact with the rest surface 256 on the flanged portion of the sleeve member 145 until permitted to advance by movement of the slot 250 into alignment therewith. If pressure is now exerted upon the feed-quick traverse lever 138 by the operator, to return the same to the feed position, the initial movement of the lever 138 causes the cam surface 302 on lug 300 to engage with the cam surface 303 to depress the plunger 246, releasing the clutch member 145 and rock shaft 140 which are then free to move with the lever 138 to the feed position.

The construction and arrangement of the electrical controls for the spindle motor, the table motor, and the feed-quick traverse clutch, will be briefly pointed out, and the mode of operation of these controls will be described in connection with the wiring diagram of Fig. 23. Power is supplied from a three phase power line having wires L1, L2 and L3. A starting and stopping switch comprising a relay T with switch contacts controlled thereby, designated also by the letter T, is provided for starting and stopping the table motor. A similar starting and stopping switch, comprising a relay S and switch contacts actuated thereby, designated also by the letter S, is provided for starting and stopping the spindle motor. The feed-quick traverse clutch throwout solenoid 210 is connected across two of the leads to the spindle motor, so that this solenoid is energized simultaneously with the starting of the spindle motor, and is de-energized upon the opening of the spindle motor starting and stopping switch to de-energize the spindle motor.

When it is desired to start the machine, the operator moves the main starting and stopping lever 52 to its starting position. Start switch contact L1—4 closes, operated by mechanical connections from the lever 52 as above described. Relay S is energized, starting the spindle motor. Relay T is energized, starting the table motor, and at the same energizing the feed-quick traverse clutch throwout solenoid 210, so that the feed-quick traverse clutch is permitted to shift freely between its feed and quick traverse positions. Contact S6—4 closes, forming a holding circuit, so that relays T and S remain energized. The machine is now in condition for operation with both the spindle and table motors running. The operation of the table, saddle and knee will now be controlled through manipulation of the usual reversing clutch levers for controlling these parts.

Figure 23:
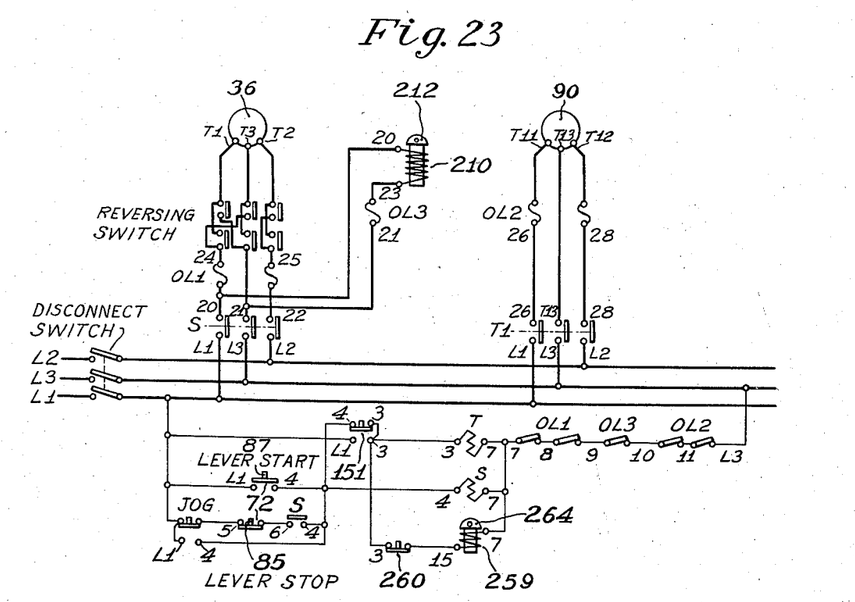
Fig. 23 is an electrical diagram illustrating the electrical hook-up of the machine.

As will be evident from an inspection of the electrical connections illustrated in Fig. 23, it is possible to move the table, saddle or knee at a quick traverse rate from one position to another without the necessity of previously actuating the main starting and stopping lever 52, and without starting the spindle motor. Assuming that the machine is in stop position, a shifting of the feed-quick traverse lever 138 to its quick traverse position, is effective to shift the feed-quick traverse clutch to its quick traverse position, and at the same time to shift the associated switch 151, opening the contact 4—3, and closing contact L1—3 to energize relay T to start the table motor.

The electrical connections for controlling the operation of the feed-quick traverse clutch in accordance with the semi-automatic cycle of operation as illustrated in Fig. 23, comprise the fast travel release solenoid 259 and the control switch 260 which form a circuit parallel with the table motor starting and stopping relay switch T, so that this circuit is energized and de-energized simultaneously with relay T. The solenoid 259 acts when energized to urge the plunger 246 into its latching position. This condition is maintained until contact 3—15 of switch 260 is opened either by the operation of a table dog, or by shifting of the device to its off position as above described.

The operation of the throwout mechanism to shift the feed-quick traverse clutch to neutral position, may be described as follows: It is assumed that the machine is in operation with the feed-traverse clutch in feed position, and that the operator actuates the main starting and stopping lever 52 to stop the entire machine. The shifting of the starting and stopping lever 52 downwardly into its stop position, acts through the mechanical connections above described, to open contact 5—6, de-energizing relay T to stop the table motor, and de-energizing relay S to stop the spindle motor. The downward movement of the starting stopping lever 52 acts also through the mechanical connections above described, to apply the spindle motor brake to mechanically brake the spindle to a stop. The opening of relay switch S acts simultaneously to de-energize the feed-quick traverse clutch throwout solenoid 210, which causes this clutch to be shifted to its neutral position. The driven support stops instantly, and before either of the spindle or table motors can be brought to rest.

It will be understood that the invention is not limited to the specific embodiment shown, and that various deviations may be made therefrom without departing from the spirit and scope of the appended claims.

What is claimed is:

1. A driving and control mechanism for milling and similar machines having a work engaging tool, a rotary holder rotatable to maintain an efficient relative surface speed of tool and work for cutting and a support movable to effect relative translatory movement of the work and tool, which comprises an electric motor for rotating the holder, an electric motor and connections therefrom including a clutch for driving the support, and control means including a machine stop control element, power operated means acting when rendered operative to disengage the clutch, and connections actuated by said stop control element to de-energize both of said motors and simultaneously to cause said power operated means to disengage said clutch.

2. A driving and control mechanism for milling and similar machines having a work engaging tool, a rotary holder rotatable to maintain an efficient relative surface speed of tool and work for cutting and a support movable to effect relative translatory movement of the work and tool, which comprises an electric motor for rotating the holder, an electric motor and connections therefrom for driving the support including an irreversible driving connection and a clutch interposed between the irreversible driving connection and the motor, and control means including a machine stop control element, and electrical control devices actuated thereby to de-energize both of said motors and simultaneously to disengage the clutch.

3. A driving and control mechanism for milling and similar machines having a work engaging tool, a rotary holder rotatable to maintain an efficient relative surface speed of tool and work for cutting, and a support movable to effect relative translatory movement of the work and tool, which comprises an electric motor for rotating the holder, an electric motor and connections therefrom for driving the support including an irreversible driving connection and a clutch interposed between the irreversible driving connection and the motor, and control means including a machine stop control operative to de-energize the rotary holder driving motor, and a clutch control device arranged to be actuated by said connections and to be rendered operative when the rotary holder driving motor is de-energized to disengage the clutch to stop support movement before the tool holder has stopped rotating.

4. A driving and control mechanism for a milling machine having a rotary tool holder, and a work support movable relatively to the tool holder, which comprises an electric motor for driving the tool holder, power means for driving the work support including an irreversible motion transmitting connection, a power source, and a clutch interposed therebetween, a clutch shifting device arranged when rendered operative to be actuated by said power means to disengage the clutch, and an electrical control system for the machine comprising a switch connection operable to stop the tool holder motor, and means actuated by said switch for simultaneously rendering said clutch shifting device operative to disengage the clutch to stop support movement before the tool holder has stopped rotating.

5. A driving and control mechanism for milling and similar machines having a rotary tool holder, and a work support movable relatively to the tool holder, which comprises an electric motor for driving the tool holder, power driving connections for the work support including an irreversible motion transmitting connection, feed and quick traverse gear trains, a feed-quick traverse clutch having feed, quick traverse and neutral positions, and control means for the machine including a switch operable to stop the tool holder motor, and means actuated by said switch simultaneously to shift the feed-quick traverse clutch from the feed to the neutral position and thereby to stop the work support before the tool holder is brought to rest.

6. A driving and control mechanism for milling and similar machines having a rotary tool holder, and a work support movable relatively to the tool holder, which comprises an electric motor for driving the tool holder, power driving connections for the work support including a support driving electric motor, an irreversible motion transmitting connection, a clutch interposed between said connection and the support motor, and a starting and stopping control for the machine including switch connections operable for starting and for simultaneously stopping both of said motors, and means rendered operative in stopping the tool holder motor to disengage the clutch and thereby to stop the support movement before the tool holder is brought to rest.

7. A driving and control mechanism for milling and similar machines having a rotary tool holder, and a work supporting assembly comprising a reciprocable work table, which comprises an electric motor for driving the tool holder, power means for driving the table including a table electric motor, feed and quick traverse transmissions driven from the table electric motor, a feed-quick traverse clutch, and an irreversible motion transmitting connection between the clutch and the table, and a control system for the machine comprising a starting and stopping control operable to start and stop both motors, a feed-quick transverse control operable to shift said clutch from feed to quick traverse position, a clutch shifting device comprising a solenoid and connections actuated thereby for shifting the feed-quick traverse clutch from feed to neutral position, and a connection rendered operative by movement of said starting and stopping control to stop position for controlling the solenoid to shift the clutch to neutral position, and thereby to stop the table before the tool holder is brought to rest.

8. A driving and control mechanism for milling machines and the like having a rotary tool holder and a reciprocable work support, individual electric motors for driving each of the tool holder and work support, and an irreversible motion transmitting connection, and clutching means interposed between the work support and its driving motor, which comprises a starting and stopping control for the machine, switch connections controlled thereby for simultaneously de-energizing both of said motors, a solenoid connected to be de-energized simultaneously with the de-energizing of the tool holder motor, and power operated means rendered operative by the de-energizing of said solenoid to disengage the clutch.

9. A driving and control mechanism for a milling machine having a rotary milling cutter spindle and a reciprocable work support, which comprises an electric motor for driving the spindle, power means for driving the support including a support electric motor, feed and quick traverse trains driven from the support motor, a feed-quick traverse clutch having feed, quick traverse and neutral positions, and an irreversible motion transmitting connection between the clutch and the support, a starting and stopping control for the machine, switch connections controlled thereby for de-energizing said motors, a power actuated clutch shifting device comprising a cam driven from the quick traverse train, a shifting member movable into the path of the cam to be actuated thereby to shift the clutch from the feed to the neutral position, and electrically operated means rendered operative simultaneously with the de-energizing of the spindle motor for moving said shifting element into the path of the cam.

10. A driving and control mechanism for a milling machine having a rotary milling cutter spindle and a reciprocable work support, which comprises an electric motor for driving the spindle, power means for driving the support including a support electric motor, feed and quick traverse trains driven from the support motor, a feed-quick traverse clutch having feed, quick traverse and netural positions, and an irreversible motion transmitting connection between the clutch and the support, a starting and stopping control for the machine, switch connections controlled thereby for de-energizing said motors, and means operative simultaneously with the de-energizing of the spindle motor to shift the clutch from the feed to the neutral position which comprises a cam continuously driven from the support motor, a clutch shifting member shiftable in the path of said cam to move the clutch from feed to neutral position, a latch operative to prevent the return of the clutch to the feed position, a solenoid connected to be energized and de-energized simultaneously with the spindle motor, and connections rendered operative by the de-energizing of the solenoid to move the shifting element into the path of the cam, and by the energizing of the solenoid to move the shifting element out of the path of the cam and to disengage the latch.

11. A driving and control mechanism for a milling machine having a rotary cutter spindle, a reciprocable work support, an electric motor for driving the spindle, and power means for driving the support including a support electric motor, feed and quick traverse trains driven from the support motor, a feed-quick traverse clutch having feed, quick traverse and intermediate neutral positions, and an irreversible motion transmitting connection between the clutch and the support, which comprises a manual feed-quick traverse control including a clutch shifting element movable between feed and quick traverse position, means acting to bias the clutch including the shifting element toward the feed position, a starting and stopping control for the machine, switch connections controlled thereby for de-energizing said motors, a clutch throw-out device for shifting the clutch from the feed to the neutral position and including a latch operative to prevent the return of the clutch to the feed position, and electrical connections operative simultaneously with the de-energizing of the spindle motor for actuating said throw-out device to shift the clutch to neutral position, and simultaneously with the energizing of the spindle motor to render the latch inoperative.

12. A driving and control mechanism for a milling machine having a rotary milling cutter spindle, and a work supporting assembly comprising a plurality of supports movable in diverse directions, an electric motor for driving the spindle, driving connections for said work supporting assembly including a support electric motor, feed and quick traverse trains driven from the motor, a feed-quick traverse clutch having feed, neutral and quick traverse positions, and branch transmissions therefrom including individual irreversible motion transmitting connections to each of said supports, a start and stop control for the machine and switch connections controlled thereby operative in stopping the machine to deenergize both of said motors, a clutch throw-out device, and power operated means operative when the spindle motor is de-energized to cause the throw-out device to shift the clutch from the feed to the neutral position.

13. A driving and control mechanism for milling and similar machines having a work engaging tool and a support movable to effect relative translatory movements of the work and tool, which comprises power driving connections for actuating the support including a feed-quick traverse clutch, a manual control element for shifting said clutch, means acting on the feed-quick traverse clutch to bias the same toward the feed position, and means for causing the feed-quick traverse clutch to operate in accordance with a semi-automatic cycle of operation which includes latching means rendered operative by the shifting of the clutch to quick traverse position to latch the clutch in the quick traverse position, and means responsive to movement of the support for releasing the latch to cause the feed-quick traverse clutch to be shifted to the feed position at a predetermined point in the travel of the support.

14. A driving and control mechanism for milling and similar machines having a work engaging tool and a support movable to effect relative movement of the work and tool which comprises power driving connections including clutching means operable to drive the support at alternate feed and quick traverse rates, a manual feed-quick traverse control including a clutch shifting element movable between feed and quick traverse positions, means acting to bias said clutch including the shifting element toward the feed position, and an automatic control device comprising means for latching the feed-quick traverse shifting element in quick traverse position, and means controlled by the movement of the support to disengage the latch.

15. A driving and control mechanism for milling and similar machines having a work engaging tool and a support movable to effect relative translatory movement of the work and tool, which comprises power driving connections for actuating the support including an electric motor, feed and quick traverse gear trains driven therefrom, a feed-quick traverse clutch, means acting to bias the clutch in the feed position, latching means rendered operative by the shifting of the clutch to quick traverse position to latch the clutch in the quick traverse position, and dogs on the support responsive to movement of the support at the quick traverse rate for releasing said latch to cause the feed-quick traverse clutch to be shifted to the feed position by said biasing means.

16. A driving and control mechanism for milling and similar machines having a work engaging tool and a support movable to effect a relative movement of the work and tool, which comprises power driving connections for actuating the support including a feed-quick traverse clutch, means under the control of the operator for starting, stopping and reversing the support, a manually operable feed-quick traverse control including a clutch shifting element movable between feed and quick traverse positions, means acting to bias said clutch including the shifting element toward feed position, and automatic control devices including means for latching said clutch shifting element in quick traverse position, means controlled by movement of the support to disengage the latch, and a selecting device under the control of the operator for rendering said latch operative or inoperative to control the position of the feed-quick traverse clutch.

17. A driving and control mechanism for milling and similar machines, having a work engaging tool and a support movable to effect relative movement of the work and tool, which comprises power driving connections for actuating the support including means under the control of the operator for starting, stopping and reversing the support, means for driving the support alternatively at feed and quick traverse rates including an element shiftable between feed and quick traverse positions, means acting to bias said element to the feed position, a feed-quick traverse lever operatively connected with said shiftable element, a latch for latching the feed-quick traverse control element in the quick traverse position, means controlled by movement of the support to disengage the latch, and means responsive to a movement of the feed-quick traverse lever toward the feed position to disengage the latch.

18. A driving and control mechanism for milling and similar machines, having a rotary tool holder and a support movable to effect relative movement of the work and tool holder, which comprises power means for rotating the tool holder, power driving connections for actuating the support including a reversing clutch, a feed-quick traverse clutch, a manually operable reversing clutch actuating lever, and means for controlling the feed-quick traverse clutch comprising a clutch shifting element movable between feed and quick traverse positions, a manually operable feed-quick traverse lever operatively connected with said shifting element, means acting to bias the clutch and shifting element toward the feed position, latching means acting on the shifting element to latch the clutch in quick traverse position, means controlled by movement of the support to disengage said latching means, and means responsive to a movement of the feed-quick traverse lever toward the feed position to disengage the latch.

19. A driving and control mechanism for milling and similar machines, having a work engaging tool and a support movable to effect relative translatory movement of the work and tool, which comprises power driving connections operable to drive the support at alternate feed and quick traverse rates, means under the control of the operator for starting, stopping and reversing the support, feed-quick traverse control means comprising a shifting element shiftable between feed and quick traverse positions, means acting to bias said shifting element to the feed position, a latch for latching said shifting element in the quick traverse position, and a manually operable feed-quick traverse lever having a lost motion connection with said feed-quick traverse shifting element, and means rendered operative by movement of the lever relatively to the feed-quick traverse shifting element toward the feed position to disengage the latch.

20. A driving and control mechanism for milling and similar machines, having a rotary tool holder and a support movable to effect relative movement of the work and tool holder, which comprises power means for rotating the tool holder, power driving connections for actuating the support including means under the control of the operator for starting, stopping and reversing the support, a feed-quick traverse clutch, a clutch shifting element shiftable between feed and quick traverse positions, means acting to bias the clutch and shifting element toward the feed position, and an automatic control device for the feed-quick traverse clutch including a latch plunger, a cooperating cam member associated with the shifting element arranged to be engaged by the latch plunger to hold the feed-quick traverse clutch in the quick traverse position, spring means for disengaging the latch, a solenoid acting when energized to urge the latch to the latching position, a dog on the support, and a switch connection actuated thereby to de-energize the solenoid and thereby to permit the withdrawal of the latch and the return of the clutch to the feed position.

21. A driving and control mechanism for a machine tool having a reciprocable support which comprises power driving connections operable to drive the support at alternate feed and quick traverse rates, manually operable control means for starting, stopping and reversing the support, a feed-quick traverse control element shiftable manually between feed and quick traverse positions, means acting to bias said element to the feed position, a latch for latching the feed-quick traverse element in quick traverse position, and means controlled by movement of the support to disengage the latch comprising an actuating dog, a dog follower arranged to be engaged and shifted by the dog, a connection rendered operative by movement of the dog follower to its shifted position to disengage the latch, and a selecting device comprising means under the control of the operator for shifting and for holding said dog follower in the shifted position.

22. A driving and control mechanism for a milling machine having a rotary milling cutter spindle, a reciprocable work support, an electric motor for driving the spindle, and power means for driving the support including a support electric motor, feed and quick traverse trains driven from the support motor, a feed-quick traverse clutch, and an irreversible motion transmitting connection between the clutch and the support, which comprises a manually operable start and stop control for the machine and switch connections controlled thereby for energizing and de-energizing both of said motors, a manually operable feed-quick traverse control including a clutch shifting element, means acting to bias the clutch including said shifting element to the feed position, and a support motor start and stop switch connected with said shifting element to start the support motor upon movement of said shifting element to the quick traverse position independently of said start and stop control.

23. A driving and control mechanism for a milling machine having a rotary milling cutter spindle, a reciprocable work support, an electric motor for driving the spindle, and power means for driving the support including a support electric motor, feed and quick traverse trains driven from the support motor, a feed-quick traverse clutch, having feed, neutral and quick traverse positions, and an irreversible motion transmitting connection between the clutch and the support, which comprises means under the control of the operator to start, stop and reverse the support, a manually operable start and stop control for the machine and switch connections controlled thereby for energizing and de-energizing both of said motors, a manually operable feed-quick traverse control including a clutch shifting element, means acting to bias said clutch including the shifting element to the feed position, a support motor control switch actuated by movement of the clutch shifting element to and from the quick traverse position to start and stop the support motor, and an automatic control for the machine comprising means for latching the clutch in the quick traverse position, and means controlled by movement of the support to release the clutch and permit its return toward the feed position under the influence of said biasing means.

24. In a machine having tool and work supports, actuating mechanism for said supports including power means and driving connections for causing a tool mounted in its support to be actuated and for causing relative movement between said tool and work supports, said driving connections for causing said relative movement including a clutch having driving and neutral positions, control mechanism for starting and stopping said power means, means actuated by the control mechanism to shift the clutch to driving position when the control mechanism is operated to start said power means, a cam and a member shifted by said cam for moving said clutch from driving to neutral position, and means for moving said shifting member into the path of the cam when said power means is stopped.

ARTHUR F. BENNETT.